No. 626,356. Patented June 6, 1899.
C. WHITNEY.
PHOTOGRAPHIC FILM ROLL.
(Application filed Feb. 25, 1897. Renewed Oct. 31, 1898.)
(No Model.)
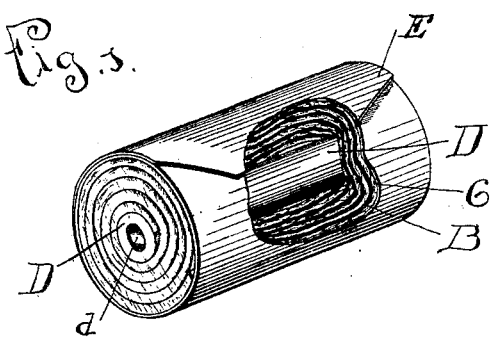
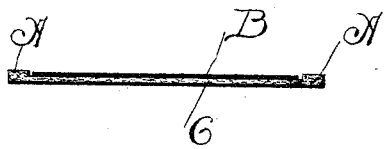
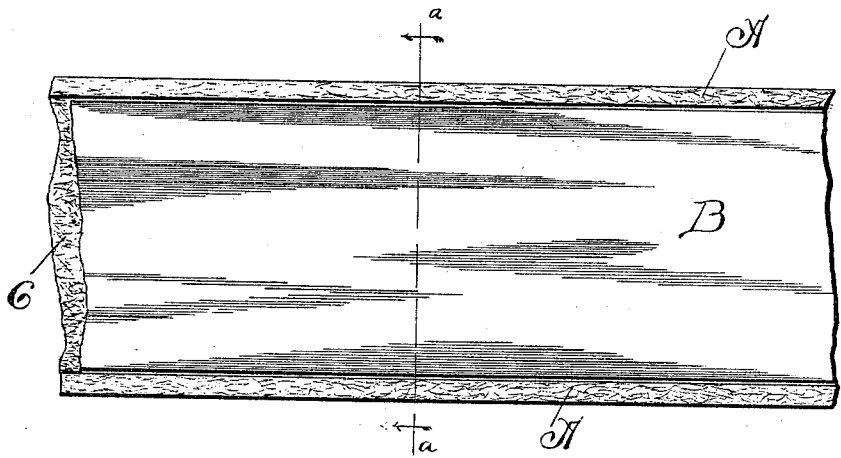
Witnesses:
JS Keir
Frank Gray
Inventor
Charles Whitney
THE NORRIS PETERS CO., PHOTO-LITHO., WASHINGTON, D. C.

UNITED STATES PATENT OFFICE.

CHARLES WHITNEY, OF WINNETKA, ILLINOIS.

PHOTOGRAPHIC-FILM ROLL.

SPECIFICATION forming part of Letters Patent No. 626,356, dated June 6, 1899.

Application filed February 25, 1897. Renewed October 31, 1898. Serial No. 695,052. (No model.)

*To all whom it may concern:*

Be it known that I, CHARLES WHITNEY, a citizen of the United States, residing at Winnetka, in the county of Cook and State of Illinois, have invented a new and useful Roll of Negative-Film for Photographic Cameras, of which the following is a specification.

My invention relates to photographic films used in cameras, and particularly those known as "daylight-rolls;" and its object is to exclude the light from the film in an inexpensive manner by simple means. This I accomplish by the means and in the manner hereinafter fully described and as particularly pointed out in the claims.

Figure 1 represents the roll complete, having a section broken away; Fig. 2, a cross-section of Fig. 3 at $a\,a$. Fig. 3 represents a longitudinal section of the roll; Fig. 4, a section or piece of the roll.

In the drawings, E represents a suitable strip of flexible negative-film, which is of any length and width desired and from which it is the object of my invention to thoroughly exclude the light until the same is exposed in a suitable camera. I accomplish this result by means of a strip of suitable opaque material C, such as paper or other known flexible fabric, which is preferably considerably longer than the negative-film E and is made sufficiently wider than the same so that at or near each side edge it may be provided with an elevated longitudinal surface or ledge A, between which said photographic negative-film is laid when placed upon said opaque material C. Now when the film E is placed upon the material C the light is excluded therefrom by covering the same tightly with another layer of said material. The film lying between the raised surfaces or ledges A and sandwiched between the two thicknesses of material C is thoroughly protected from the light.

In the drawings the flexible negative-film is given the form of a long comparatively narrow strip and is designed to be wound upon a spool or winding-post D, having a small hole $d$ extending through its center for the winding-rod. The opaque material C, which is of sufficient width for the film E to be placed between its side ledges A, has its ends extending far enough beyond the ends of the film for it to make several laps upon the spool after the film is all wound up, for the purpose of covering the film before and after its exposure.

The raised surfaces of the wrapping material C may be formed by pasting thereon strips of any suitable material or by folding over the edge of the same; but I prefer to produce the said ledges, when said material is made of paper, by simply omitting to calender the edges when the paper is undergoing the finishing process at the mill.

Deeming the foregoing a sufficient description of my invention, what I claim, and desire to secure by Letters Patent, is—

1. For photographic purposes a light-tight coil of sensitized film composed of a strip of opaque material provided with a ledge at each side adapted to receive the sensitized material between the ledges, said ledges adapted to exclude the light from the sensitized material when wound upon a post for use in photographic cameras, substantially as described.

2. A coil of sensitized negative-film protected from the light by a backing of opaque material adapted to protect the sides of said coil said opaque material having ledges at each side adapted to protect the ends of said coil from the light, substantially as described.

3. As an article of manufacture, a coil of flexible sensitized material placed between two ledges on a backing-strip of opaque material and coiled around a winding-post, the light-excluding material outside and the ledges at each end of said coil and the roll of sensitized material all adapted for use in photographic cameras, substantially as described.

4. A wrapper for photographic negative-film consisting of a suitable strip of opaque material having raised surfaces or ledges at or adjoining each side edge thereof.

CHARLES WHITNEY.

Witnesses:
GEORGE WHITNEY,
FRANK WHITNEY.